UNITED STATES PATENT OFFICE.

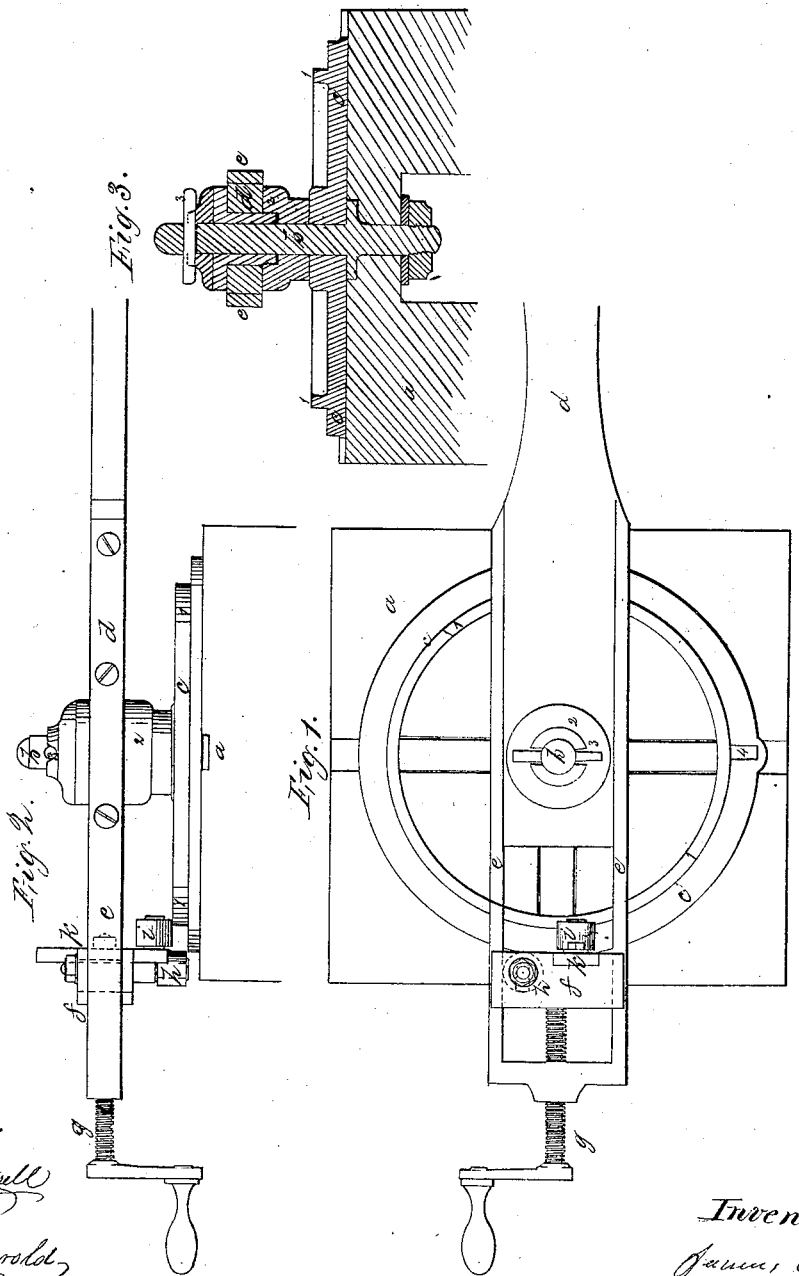

JUNIUS FOSTER, OF BROOKLYN, NEW YORK, ASSIGNOR TO J. HERBOLD, G. KUHN, AND J. FOSTER.

MACHINE FOR SWAGING IRON.

Specification of Letters Patent No. 16,775, dated March 3, 1857.

*To all whom it may concern:*

Be it known that I, JUNIUS FOSTER, of Green Point, Brooklyn, in the county of Kings and State of New York, have invented, made, and applied to use certain new and useful Improvements in Means for Forming Fifth-Wheels for Carriages or other Vehicles; and I do hereby declare that the following is a full, clear, and exact description of the construction and operation of the same, reference being had to the annexed drawings, making part of this specification, wherein—

Figure 1, is a plan of said means. Fig. 2, is a side elevation of the same, and Fig. 3, is a vertical section at the center of the machine.

Similar marks of reference denote corresponding parts.

In the manufacture of the fifth wheels of vehicles, or the circles on which the front axle turns, great difficulty is experienced in making the same perfectly flat and circular. The plan which has heretofore been pursued is to bend the iron forming said fifth wheels into a circular form corresponding with a pattern or with a circle struck on a board. This is not only tedious and expensive, but the circles or rings are more or less inaccurate and inefficient in use.

The nature of my said invention consists in bending up the metal forming said rings or circles on a circular metallic die or pattern, by means of peculiarly formed and adjusted rollers on a radius bar or lever moving around the center of said metallic die or pattern whereby the fifth wheels are made perfectly flat and true and of a uniform size, and the same is done very rapidly with but one heating of the iron previous to the ends being welded together.

In the drawing $a$, is a suitable block or bench on which a center pin or gudgeon $b$ is firmly attached.

$c$, is a cast metal pattern setting around said pin $b$, and this pattern can be removed and another substituted adapted to the size required for the circle to be formed, and said pattern $c$, is formed with a flat bed a rim or flange 1, upon and against which the flat iron bar forming the circle is bent by the means hereafter set forth.

$d$, is a lever mounted on a box 2, setting around the pin $b$, when it is secured by a cross key or pin 3.

$e, e$, are straps or slides of metal receiving the block $f$, that is adjusted to suit any sized pattern $c$, by means of the screw $g$, and said block $f$ carries a roller $h$, on a vertical axis depending from the under side of the block and also a roller $i$, on a horizontal axis on an arm $k$ that is attached to the block $f$ by a clamp screw passing through a slot so that the position of said roller $i$ can be adjusted.

The machine having been properly adjusted with reference to the sized wheel to be formed and the thickness and width of iron to be used, the workman heats the piece of iron, turns down a lip on the end and inserts the same in a hole or notch 4, and on turning the lever $d$ the rollers $h$ and $i$ press onto the flat side and edge of the bar and bend the same around the pattern $c$, and make a perfectly flat and true circle. The ends are to be cut off at the right place and welded together as usual. The circle can be removed when bent, previous to welding by withdrawing the pin 3 and lifting up the lever $d$.

What I claim as my invention and desire to secure by Letters Patent is—

The adjustable block $f$ and rollers $h$ and $i$, set on and moved by the lever $g$ when combined with the pattern $c$, and flanch 1, the whole constructed and operating substantially as specified.

In witness whereof I have hereunto set my signature this sixteenth day of January 1857.

JUNIUS FOSTER.

Witnesses:
LEMUEL W. SERRELL,
THOMAS G. HAROLD.